Figure 10:
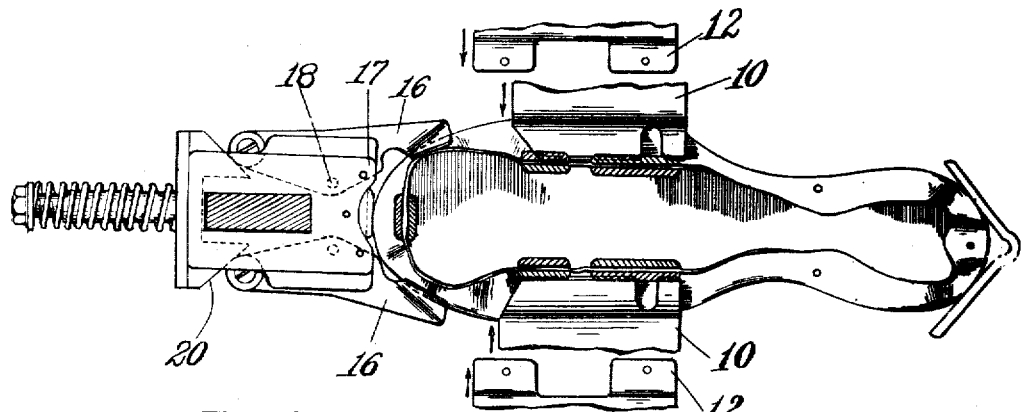

R. F. McFEELY.
METHOD OF MAKING SHOES.
APPLICATION FILED AUG. 1, 1907.
1,135,951.
Patented Apr. 13, 1915.
4 SHEETS—SHEET 1.
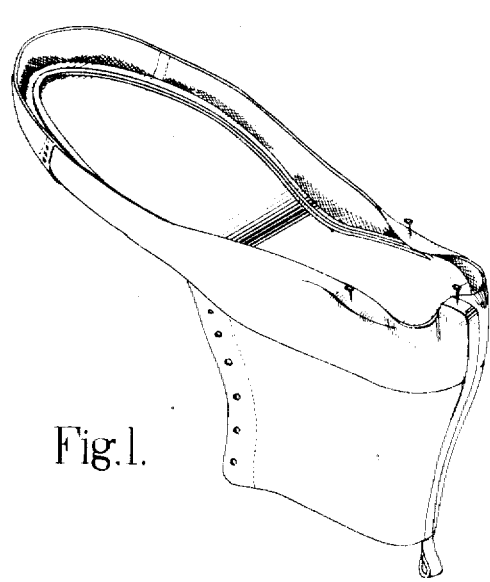
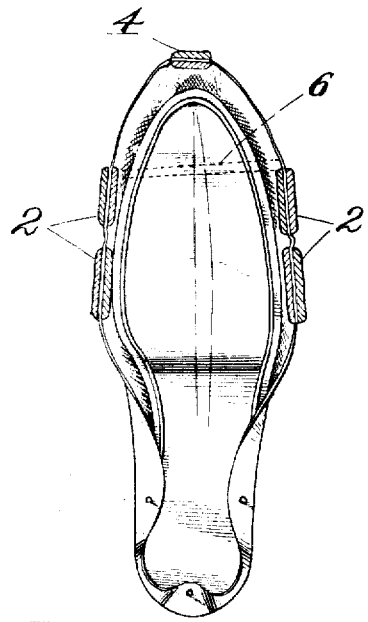
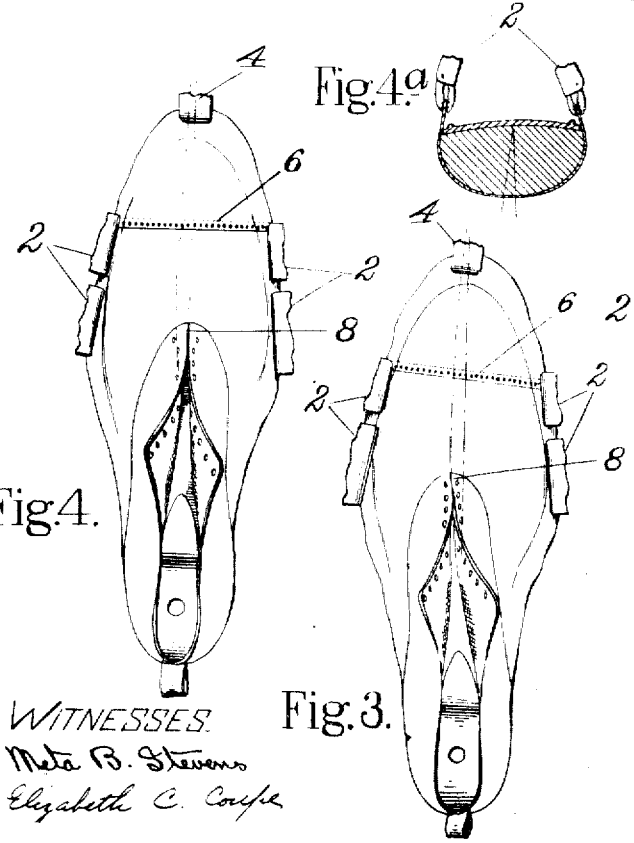

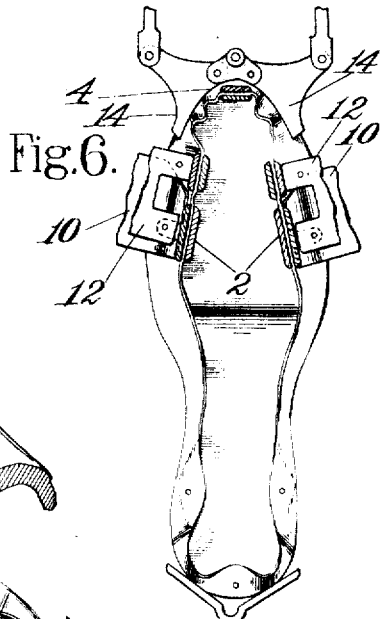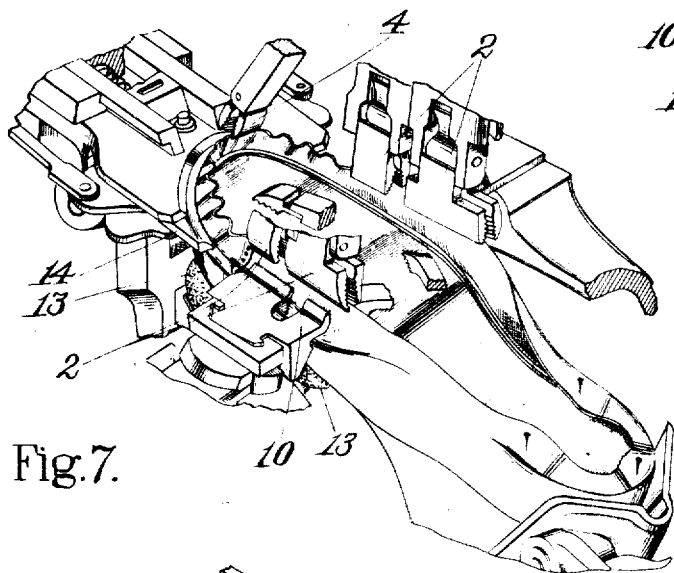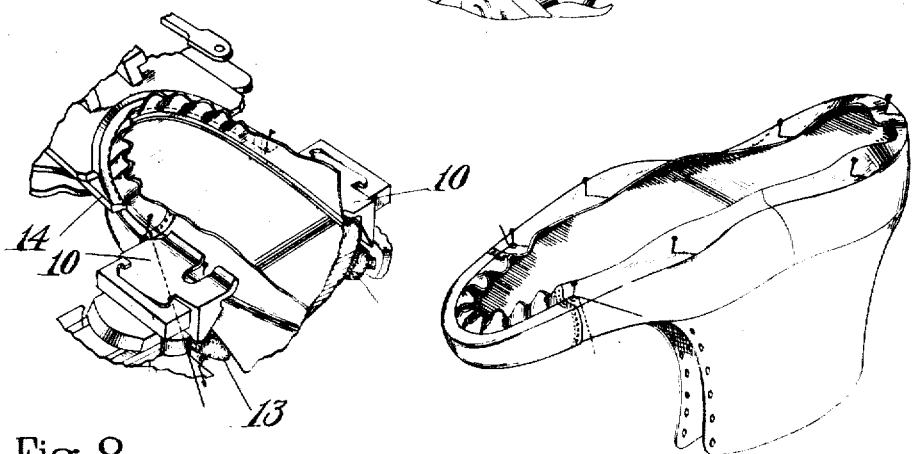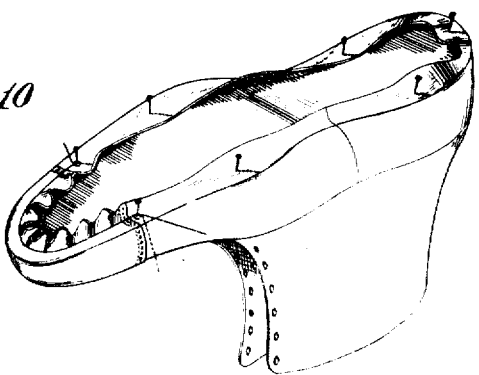

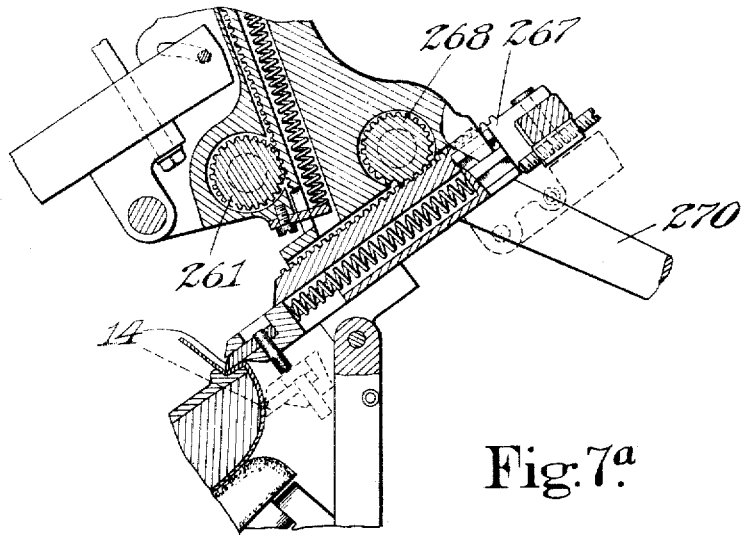
Fig. 7ª

UNITED STATES PATENT OFFICE.

RONALD F. McFEELY, OF BEVERLY, MASSACHUSETTS, ASSIGNOR TO UNITED SHOE MACHINERY COMPANY, OF PATERSON, NEW JERSEY, A CORPORATION OF NEW JERSEY.

METHOD OF MAKING SHOES.

1,135,951.   Specification of Letters Patent.   Patented Apr. 13, 1915.

Application filed August 1, 1907. Serial No. 386,572.

*To all whom it may concern:*

Be it known that I, RONALD F. MCFEELY, a citizen of the United States, residing at Beverly, in the county of Essex and Commonwealth of Massachusetts, have invented certain Improvements in Methods of Making Shoes, of which the following description, in connection with the accompanying drawings, is a specification, like reference characters on the drawings indicating like parts in the several figures.

This invention relates to the manufacture of boots and shoes, and particularly to a novel method of conforming an upper to a last. It is the usual practice to pull-over a shoe, and fasten the upper in pulled-over position in one operation or series of steps, and then to last the shoe in an independent operation at a subsequent time, requiring a second handling of the shoe. In the pulling-over operation the upper is pulled and adjusted into approximately the correct relation to the last, and its marginal edge is laid over upon the last bottom and tacked to the innersole. In the lasting operation the pulling-over tacks are usually removed and the upper is worked into lasted position and again secured to the innersole. Sometimes the pulling-over operation is done by hand and at other times in a pulling-over machine. The lasting operation is usually done by a different workman and on a machine adapted especially for the purpose, and it is always an operation distinct and separate from the pulling-over operation. This procedure in pulling-over and lasting shoes requires that a shoe be handled twice and to some extent it involves a duplication of steps for the upper which has been drawn over the innersole and tacked to secure it after the pulling-over operation is usually loosened and in all cases it must again be strained and drawn over the last bottom in the lasting operation and then secured to hold it in lasted position.

An important object of the present invention is to combine the two operations of pulling-over and lasting, thereby dispensing with one handling of the shoe and saving the attendant expense and inconvenience, and also rendering unnecessary such duplication of work as is involved where two separate and distinct operations are performed.

The method of this invention comprises a series of steps by which the pulling-over and lasting operations may be combined with advantageous results both as to economy in production of shoes and satisfactory preparation of the shoes for subsequent shoemaking operations.

As herein illustrated the upper is pulled simultaneously at the opposite sides of the last, and preferably is pulled at the toe also, and is adjusted into desired relation to the last while it is held under strain. The upper is then worked into lasted position while still held under strain so that no opportunity occurs for losing the adjustment of the upper.

The way in which the upper is worked into lasted position is not essential to the broadest aspect of the invention. For example, the upper may be worked into lasted position at the sides and the toe end of the forepart of the shoe simultaneously or at different times. Sometimes it may be first overworked at the opposite sides of the shoe and then the toe portion of the upper, which requires crimping to take care of the fullness in the upper material, may be manipulated into lasted position. In overworking the upper at the toe the entire toe portion may be forced inwardly toward lasted position together or separate portions may be worked into lasted position at different times. For instance, the upper at the corners of the toe may be folded over the last bottom in advance of folding over the upper from the end of the toe. In following the latter course, which is particularly advantageous in turn shoe work, the upper at the corners of the toe will preferably be forced inwardly over the last in a direction transverse of the last bottom and substantially perpendicular to the median line of the sole of the last. Then the upper from the end of the toe will be folded over that from the corners of the toe to dispose of the fullness in the upper. This way of overworking the upper at the toe portion of the shoe has the advantage that it smoothly disposes of the fullness in the upper material and reduces liability of forming wrinkles in the upper at the edge and side of the shoe, especially in the regions of the rear ends of the corner wipers. A further advantage is that the upper overworked in this way may be securely fastened by a small number of lasting tacks.

Preferably the upper material is fastened in lasted position without opportunity being given for the tension on the upper to be relaxed, and as the method is herein shown as practised the upper is clamped to the last and held against slipping back while the securing means is being applied. Tacks may be used for securing the upper, or a binder of wire or other continuous material, or tacks may be employed at the sides of the shoe and a wire used about the toe end.

In the illustrated manner of practising the invention the upper at the opposite sides of the forepart and at the end of the toe is pulled in directions to hold it away from the edge of the bottom of the last around the toe and the margin of the upper is thereafter pulled inwardly toward the edge of the last and then a continuous section of said upper is worked into lasted position over the bottom of the last from one side of the toe around to the other side. This manner of pulling outwardly and then pulling or wrapping the upper inwardly tensions the upper most efficiently and prepares it for lasting most smoothly. The efficient tensioning and smooth lasting of the upper may be further increased by rubbing the upper in the direction of the pull from below the plane of the shoe bottom toward its edge while taking up by continued tension the slack developed by the rubbing.

The invention will be more fully explained in the following description in which reference will be made to the accompanying drawings. These drawings illustrate how the invention may be carried out, showing portions of apparatus which may be employed in the practice of the invention. No claim is made herein to this apparatus as it forms the subject-matter of my applications Serial Nos. 372,055 and 375,669.

Figure 11:
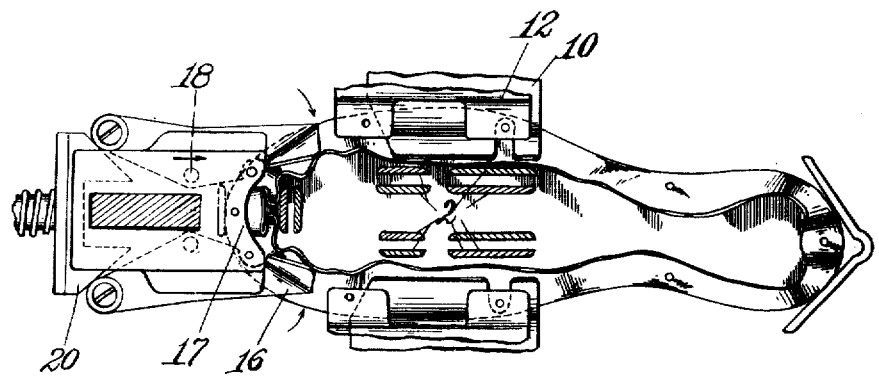
Figure 12:
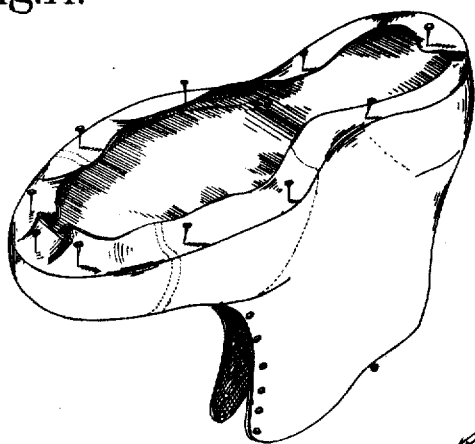

Figure 1 is a perspective view of a shoe illustrating the condition in which it may be prepared for the practice of this method. Fig. 2 is a bottom plan view of the shoe after it has been pulled, illustrating by dotted and broken lines incorrect positions, respectively, of the toe tip seam and the median line or lace opening of the upper which require to be corrected by adjustments of the upper transversely and longitudinally about the last. Fig. 3 is a top plan view of the shoe, shown in Fig. 2. Fig. 4 is a top plan view of the forepart of a shoe shown in Fig. 3, after the upper has been adjusted transversely and longitudinally of the last. Fig. 4ª is a transverse sectional view illustrating how one gripper may be raised and the other one lowered to effect transverse adjustment of the upper. Fig. 5 is a bottom plan view showing the upper adjusted into correct relation to the last and still held under strain in condition to be worked into lasted position. Fig. 6 is a plan view of the shoe with certain portions of lasting devices in the position occupied by them when forcing the upper into lasted position while it is held under strain by the pulling grippers at the sides and end of the shoe. Fig. 7 is a perspective view on a larger scale showing the grippers opened and the upper held by the lasting devices. This view shows tacks inserted at the sides of the shoe to secure the upper in lasted position. Fig. 7ª is a longitudinal sectional view through the toe end of the shoe and the toe lasting devices of Fig. 7, showing the upward rubbing of the tensioned upper from the dotted to the full line elevation of the lasting devices. Fig. 8 shows the end lasting wipers lifted slightly to receive a wire binder which has been anchored to a tack at one side of the shoe and is being drawn about the toe end of the shoe to secure the upper at that portion of the shoe. Fig. 9 is a perspective view of a shoe pulled-over and lasted in accordance with this invention by the aid of the lasting devices shown in Figs. 6, 7 and 8. Fig. 10 is a view corresponding to Fig. 6, showing a pulled-over shoe and illustrating the use of a different end lasting mechanism in practising the invention. Fig. 11 is a similar view showing the lasting devices in final position for over-working the upper and the pulling grippers released from the upper. Fig. 12 is a perspective view of a shoe pulled-over and lasted in accordance with this invention by the aid of the lasting devices shown in Figs. 10 and 11.

In the practice of the invention a shoe suitably assembled, as, for example, in the condition shown in Fig. 1 is first pulled to the last to conform the upper to the contour of the irregular surfaces of the last. An apparatus which may be employed for thus pulling the upper is shown in United States Letters Patent No. 663,777, granted on my application of December 11, 1900. When the upper has been pulled it is held under strain by the pulling grippers 2—2 and 4, which are preferably located at the opposite sides and at the toe of the shoe, while the workman examines the shoe and makes such adjustments of the upper, if any, as may be needed to position the upper in desired relation to the last. It is frequently found that the toe tip seam 6 extends obliquely across the last or that the lace opening 8 of the upper is out of position laterally. The tip seam is straightened by moving the side grippers 2—2 lengthwise of the last in opposite directions. The upper may be adjusted laterally to position the lace opening by moving the side grippers in opposite directions perpendicularly to the last bottom. After these manipulations the shoe is subjected to the lasting operation by which the upper, still held under tension, is worked over the last bottom into lasted position as illustrated, for example, in Figs. 7 and 9, or in Figs. 11 and 12. The lasting may be effected in any desired way by hand or with the aid of appropriate mechanism. The mechanism shown in Figs. 6 and 7 and that shown in Figs. 10 and 11 have been found useful under different conditions. These mechanisms of course form no part of the present invention and their novel features are claimed in my pending applications before mentioned.

Referring to Figs. 6, 7, 7ª and 8 it will be seen that the upper at the sides of the last while still held under the pulling tension is carried over the last bottom by the side grippers 2—2, being at the same time wiped and pressed into lasted position by the side pressers 10—10 and the tack blocks 12—12. The toe portion of the upper is carried over the last bottom under tension by the toe gripper 4 and is wiped or rubbed upwardly over the side faces of the last and crimped inwardly into lasted position about the toe portion of the last by the wipers 14—14. To sustain the shoe against the lasting devices supporters 13 may be employed which are brought into operative relation to the shoe after the upper has been adjusted about the last. When the pressers and the wipers have come into holding engagement with the upper so that it cannot slip back the grippers may be opened as in Fig. 7. The toe embracing movement of the wipers 14, 14 and their overwiping movement is effected by an operating lever 270 and pinion and rack connections 267, 268, Fig. 7ª, and the upward rubbing movement of the wipers after they have embraced the toe and while they are being raised to the plane of the shoe bottom preparatory to overwiping is effected by a rack and a pinion 261, Fig. 7ª, and an actuator connected with said pinion, all as fully shown and described in my companion application Ser. No. 372,055. The wipers 14—14 are constructed and arranged to shape the upper over the marginal edge of the shoe bottom and press it against the usual channel lip of a welt innersole when welt shoes are being pulled-over and lasted. In doing this a seat adapted to receive a binder 15 of wire or the like, is formed in the upper adjacent to the junction of the lip and the marginal edge of the innersole. This binder is anchored to one of the previously driven tacks which hold the upper in lasted position at the sides of the shoe, and is carried around the toe portion of the shoe between the wipers and the shoe bottom, as shown in Fig. 8. The wipers may be raised slightly and backed away from the seat to permit the wire to be put into position and may then be closed about the wire and advanced to force the wire into proper binding engagement with the upper to hold it in lasted position. The free end of the wire will then be anchored to an adjacent side tack. The wipers and pressers will then be withdrawn from the shoe which will have been pulled-over and lasted, as shown in Fig. 9.

In practising the invention with the aid of the apparatus shown in Figs. 10 and 11 the upper is pulled on the last, adjusted and carried over the last bottom by the grippers 2, 2 and 4 in the same way as already described and the side pressers 10—10, tack blocks 12—12 and the side supporters 13—13 are used as above explained. The upper material at the toe is forced into lasted position on the shoe bottom by wipers 16, 16 and 17, the wipers 16, 16 being arranged to engage the upper at the corners of the toe of the shoe before the wiper 17 engages the upper at the end of the toe. The corner wipers 16, 16 then close inwardly wiping the upper over the last bottom in directions approximately perpendicular to the median line of the last bottom. In this operation of the corner wipers it will be understood that the upper is wiped inwardly without being forced lengthwise of the last and liability of forming wrinkles at and adjacent to the free ends of the wipers is avoided.

The inward movement of the corner wipers takes place about their pivots 18—18, being effected by the wedge block 20 which engages rollers on the heels of the wipers. The wiper 17 for the end of the toe is advanced with the wedge block and comes into engagement with its portion of the upper after the corner wipers 16, 16 have begun to force the upper inwardly from the corners of the last. By thus forcing the upper from the end of the last over the last bottom after the upper from the corners of the last, the end portion of the upper is folded over or upon the corner portions, as shown in Figs. 10, 11 and 12. With this apparatus the upper is secured in lasted position by tacks at the toe portion of the shoe as well as at the sides of the shoe, the wiper 17 being provided with openings through which three tacks are driven in the position shown in Fig. 12. After the insertion of the tacks the pressers, tack blocks and wipers are retracted releasing the shoe which is pulled-over, lasted and has the upper secured in lasted position, as shown in Fig. 12.

It will be understood that my novel method is not limited to practice by means of the apparatus herein shown and described, as that apparatus is illustrated and its use is described merely for the purpose of showing one way in which the method may be practised. The invention is, of course, not limited to any apparatus and the performance of the succession of steps in which my improved method consists is within my invention in whatsoever manner or by whatsoever means those steps may be performed.

Having explained the nature of this invention and described how it may be practised, I claim as new and desire to secure by Letters Patent of the United States:—

1. That improvement in methods of making shoes which consists in pulling the upper at the toe and at the opposite sides, adjusting the pulled upper about the last, securing the upper at the sides of the shoe, then while it is under the pulling strain working the toe portion of the upper into lasted position over the innersole and finally securing the upper at the toe.

2. That improvement in methods of making shoes which consists in pulling an upper on a last at the toe and at the opposite sides of the last, adjusting the upper about the last, forcing the marginal portion of the upper inwardly over the last bottom at the corners of the toe portion of the last first, and then at the middle of the toe portion of the last.

3. That improvement in methods of making shoes which consists in pulling the upper on a last at the opposite sides of the forepart and at the end of the toe in directions to hold it away from the edge of the bottom of the last around the toe, and then pulling upon the margin of the upper to draw the upper inward toward said edge and working a continuous section of the upper into lasted position over the bottom of the last from one side of the forepart around the toe to the other side.

4. That improvement in methods of making shoes which consists in pulling the upper on a last at the opposite sides of the forepart and at the end of the toe, pressing upon a substantially continuous section of the upper at the toe end of the last from one side of the forepart around the toe to the other side to retain the upper under tension, releasing the tension on the margin of the upper at the toe end, and there wiping the upper into lasted position from said line of pressure over the bottom of the last.

5. That improvement in methods of making shoes which consists in pulling the forward portion of an upper or vamp at the end and sides of the toe to stretch it first longitudinally forward over the toe end of the last and then transversely across the forepart of the last in such directions relative to the plane of the last bottom as to hold the margin of the vamp away from the edge of the innersole on the last bottom, holding the vamp under tension and free from wrinkles over the upper portion of the toe of the last, engaging a continuous line of such unwrinkled portion of the vamp extending from one side of the forepart around the toe to the other side and located below the plane of the last bottom, rubbing upwardly while maintaining said continuous line of engagement unbroken to mold the upper free from wrinkles up the side faces of the last to the edge of the shoe bottom and then gathering the margin of the upper over the edge of the innersole into lasted position.

6. That improvement in methods of making shoes which consists in tensioning the toe portion of an upper upwardly relatively to the plane of the bottom of an inverted last, then while holding the upper under tension rubbing the upper in the direction of the pull from below the plane of the shoe bottom toward its edge while taking up by continued tension the slack developed by the rubbing, and then carrying the margin of the upper over upon the shoe bottom and fastening it.

In testimony whereof I have signed my name to this specification in the presence of two subscribing witnesses.

RONALD F. McFEELY.

Witnesses:
ARTHUR L. RUSSELL,
JAMES R. HODDER.

Copies of this patent may be obtained for five cents each, by addressing the "Commissioner of Patents, Washington, D. C."

It is hereby certified that in Letters Patent No. 1,135,951, granted April 13, 1915, upon the application of Ronald F. McFeely, of Beverly, Massachusetts, for an improvement in "Methods of Making Shoes," an error appears in the printed specification requiring correction as follows: Page 4, line 47, claim 4, for the word "there" read *then;* and that the said Letters Patent should be read with this correction therein that the same may conform to the record of the case in the Patent Office.

Signed and sealed this 11th day of January, A. D., 1916.

[SEAL.]

J. T. NEWTON,
*Acting Commissioner of Patents.*

Cl. 12—145.